UNITED STATES PATENT OFFICE.

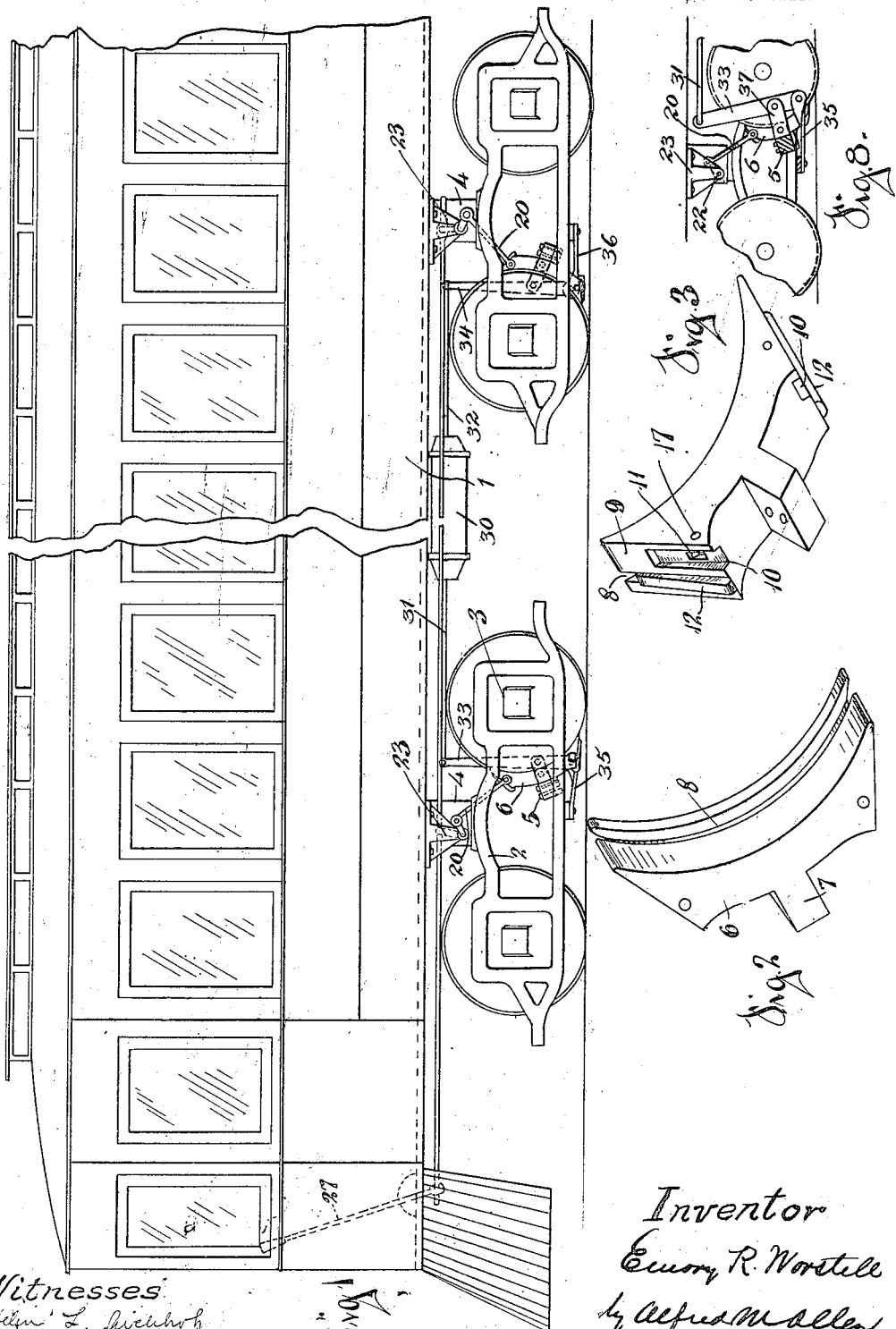

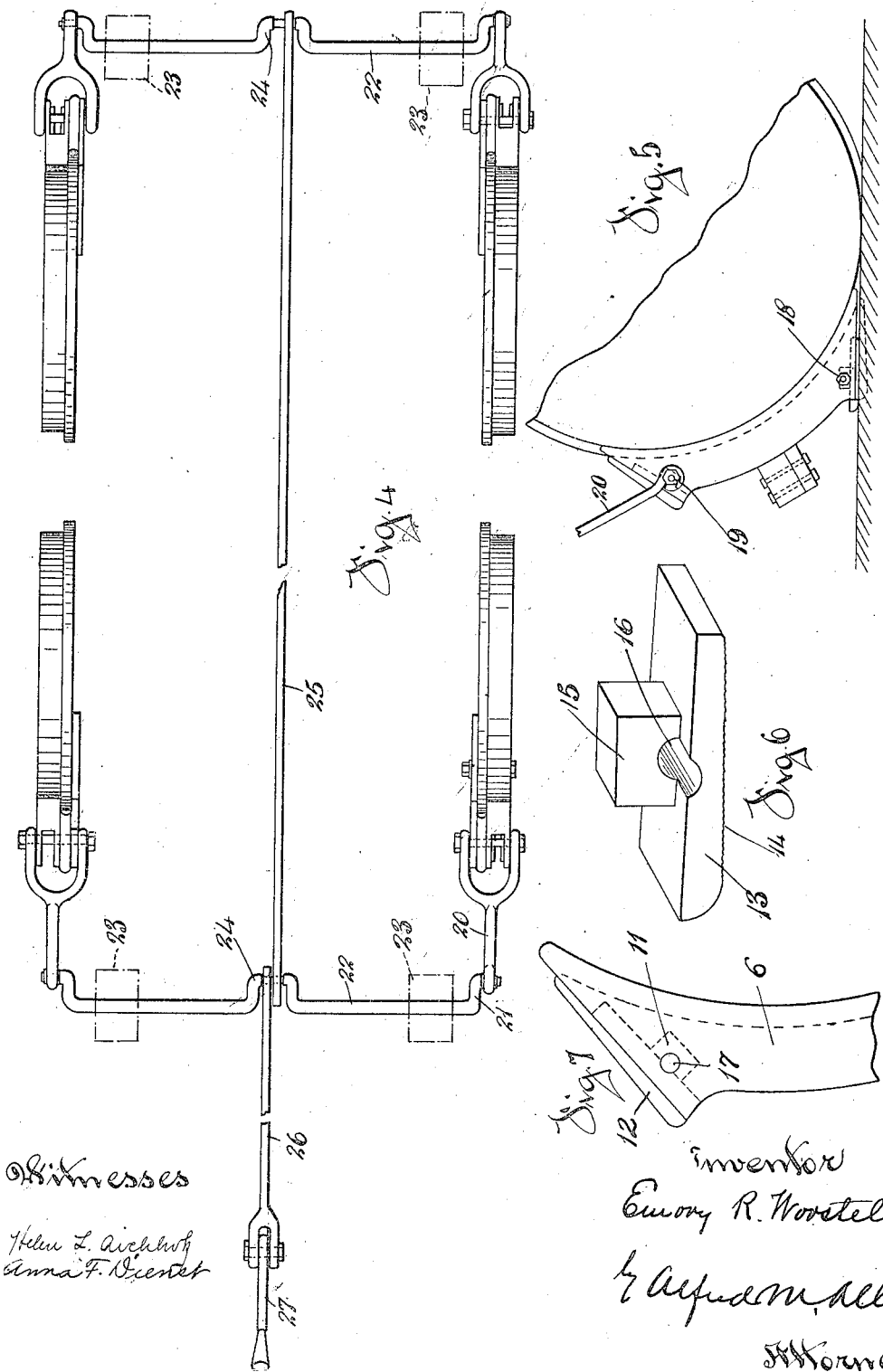

EMORY R. WORSTELL, OF ST. BERNARD, OHIO.

SAFETY-BRAKE.

1,243,373.

Specification of Letters Patent.  Patented Oct. 16, 1917.

Application filed April 17, 1912. Serial No. 691,422.

*To all whom it may concern:*

Be it known that I, EMORY R. WORSTELL, a citizen of the United States, and a resident of the city of St. Bernard, in the county of Hamilton and State of Ohio, have invented certain new and useful Improvements in Safety-Brakes, of which the following is a full, clear, and exact description, reference being had to the accompanying drawings, forming part of this specification.

My invention relates to safety brakes particularly designed for traction cars in which provision is made for projecting a wedge between the tread of the wheel and the track to block the wheel from movement.

The special object of my invention is to provide a construction which may be utilized in connection with the ordinary air brake or hand operating system, and in which provision is made for shifting the brake shoes for the application of the safety wedge block without disarranging or affecting the ordinary methods for applying the brakes to control and stop the car when running under normal conditions.

The invention consists of that certain novel construction and arrangement of parts to be hereinafter particularly pointed out and claimed, in which the end faces of the brake shoes are formed to receive and hold wedge plates, and mechanism is provided for normally suspending the brake bars and shoes for the application of the ordinary brake mechanism, and the parts are so constructed and connected that by the operation of a hand lever, the brake bars and shoes may be lowered to bring the wedge plate between the tread of the wheel and the track.

In the drawings,

Figure 1 is a side elevation of a portion of the traction car with my invention applied thereto, with the brake shoes in their normal position.

Fig. 2 is a perspective view showing the inner face of one of the brake shoes with the wedge plate removed.

Fig. 3 is a similar perspective view of the outside.

Fig. 4 is a plan view of the operating mechanism.

Fig. 5 is a detail side elevation of a portion of one car wheel showing the safety brake in use.

Fig. 6 is a perspective view of one of the wedge plates.

Fig. 7 is a side elevation of the upper end of one of the brake shoes with the wedge plate removed.

Fig. 8 is a side elevation of a portion of the car showing the ordinary brake operating construction.

A portion of a traction car is indicated by the numeral 1, with two four-wheeled car trucks of the ordinary and usual construction, in which the side trusses of the truck frame are indicated by 2, with the axle boxes 3 vertically movable therein. The center casting, upon which the car rests, as indicated at 4.

I have made no attempt to illustrate in detail the car truck construction, as my invention is applicable to any of the ordinary car trucks in use. The ordinary brake beam is indicated at 5, and on this beam are bolted the brake shoes 6. The ordinary brake operating mechanism, either air or hand is applied in the usual way to these brake bars for holding them in position and for applying the brake shoes to control the speed and for stopping the car, and I have not illustrated in detail the braking devices for shifting the brake beam, except that the ordinary air brake cylinders are indicated at 30, with connecting rods 31, 32, to the levers 33, 34, which are pivoted at the lower end in suitable supports 35, 36, bolted to the brake frame. The lower ends of these levers are loosely coupled by links 37 to the brake beams 5. It will thus be seen that the brake beams may be shifted to apply and release the brakes in the ordinary way, and it will be evident, as hereinafter described, that the brake beams and shoes may be lowered without affecting the ordinary construction. The brake shoes 6, with the tongue 7 for bolting the shoes to the brake beam, may be of any of the well known constructions, but I prefer to form each end of the brake shoe identical with the opposite end, in order that the shoes may be used for the car wheels on the right or left by merely reversing the shoes. The brake shoes are also provided with a groove 8, to receive and embrace the flange of the car wheel.

In each end face 9 of the brake shoes I cut a groove 10, with a socket 11 in the base of the groove, and in the same plane with the groove 8 in the face of the shoe on the top surface, I form a guide flange 12. Fitted in the end face of the brake shoe nearest the track is the wedge plate indicated in Fig. 6, in which 13 is the body of the plate, with its outer contacting surface roughened or formed with slight corrugations 14, and with the opposite face of the plate formed with a tongue 15 arranged to fit in the socket 11. A bolt opening 16 is formed transverse the plate and tongue, as indicated in Fig. 6, with suitable openings 17 in register therewith through the side faces of the shoe. The wedge plate is secured in position on the shoe by a suitable bolt 18, with the flange 12 extending beyond the surface of the wedge plate. The object of this construction is to provide a side bearing for the brake shoe with the track when the wedge plate is brought into use. Otherwise the wedge plate might raise the flange of the wheel clear of the track and the car might be derailed. The opposite end of the brake shoe is coupled by a bolt 19, with the bifurcated arm 20, which is coupled on the crank arm 21 at each end of a crank shaft 22 which is supported underneath the car by suitable hangers 23. Each of the brake shoes in use on the car can thus be suspended from its proper crank shaft 22, mounted as described above the car truck.

A double crank 24 is provided for the middle of the crank shaft, or in such position intermediate its length as may be more convenient, and the two double cranks are connected by a connecting rod 25 and the forward crank by connecting rod 26 with a hand lever 27, which is located in the front vestibule or on the front platform of the car in convenient access for the motorman. The lower faces of the several brake shoes in use being equipped with the wedge plates as above described, and the shoes and brake beams being held by the arms 20, instead of by the usual chain or link which ordinarily is employed to sustain the weight of the brake beam, in the event that it is desired to apply the safety device, the motorman merely shifts the lever 27 to the front, rocking the crank shafts and pushing down the brake shoes until the lower end of the brake shoe with the wedge plate becomes wedged between the tread of the wheel and the truck, thus locking the wheels against movement.

In order that convenient provision may be made for the safety appliance in backing the car, I find it convenient to apply one set of brake shoes to the rear of the car wheels as indicated on the right in Fig. 1. In applying the safety brake during the forward movement, while this set of brake shoes may be lowered, they have no effect, and only come into play during the backward movement of the car, in which event the safety wedge blocks on the forward side of the wheels are inoperative.

Having thus described my invention, what I claim as new and desire to secure by Letters Patent, is:—

1. In a safety appliance for car brakes, the combination of brake shoes, and car wheels, and means for applying the shoes to the tread of the wheels above the track, of a wedge plate mounted on the lower end of the shoe, a flange on the shoe depending beyond the surface of the wedge plate, and means for depressing the brake shoes to project the flange of the shoe over the rail and the wedge plate between the tread of the wheel and the track for emergency stops.

2. In a safety appliance for car brakes, the combination of brake shoes, and car wheels, and means for applying the shoes to the tread of the wheels above the track, of a wedge plate mounted on the lower end of the shoe, a flange on the shoe depending beyond the surface of the wedge plate, a slot in the shoe to receive the flange of the car wheel, and means for depressing the brake shoes to project the flange of the shoe over the rail and the wedge plate between the tread of the wheel and the track for emergency stops, said slot in the shoe permitting the flange of the wheel to remain in engagement over the track.

3. In a safety appliance for car brakes, the combination of brake shoes, and car wheels, and means for applying the shoes to the tread of the wheels above the track, of a wedge plate, means for mounting the same at either end of the brake shoe, and means for depressing the brake shoes to project the wedge plate between the tread of the wheel and the track.

4. In a safety appliance for car brakes, the combination of brake shoes, and car wheels, and means for applying the shoes to the tread of the wheels above the track, of a wedge plate, means for mounting the same at either end of the brake shoe, a flange on the shoe depending beyond the surface of the wedge plate, and means for depressing the brake shoes to project the wedge plate between the tread of the wheel and the track, and the flange on the shoe over the rail.

EMORY R. WORSTELL.

Attest:
EARL W. GRIFFIN,
ANNA F. DIENST.